July 14, 1931.   F. M. FICHTEN   1,814,679
CLOCK MECHANISM
Filed Jan. 21, 1926   2 Sheets-Sheet 1

Inventor:
Frank M. Fichten

July 14, 1931.  F. M. FICHTEN  1,814,679
CLOCK MECHANISM
Filed Jan. 21, 1926   2 Sheets-Sheet 2

Inventor:
Frank M. Fichten
By
Attorneys

Patented July 14, 1931

1,814,679

UNITED STATES PATENT OFFICE

FRANK M. FICHTEN, OF DAVENPORT, IOWA

CLOCK MECHANISM

Application filed January 21, 1926. Serial No. 82,722.

This invention relates to clock mechanism and is particularly directed to clock mechanism for use on automobiles.

Objects of this invention are to provide a device which will record the actual running time of the motor, which is wholly automatic in its action, which is so controlled by the ignition switch as to require no attention on the part of the operator for initiating the recording, and which will cease recording whenever the ignition switch is opened.

It has been found that the speedometer is not a suitable check against the consumption of gasolene, as it is obvious that the speedometer operates only when the automobile is traveling, but does not operate when the motor is running idle, as for instance when numerous stops are made.

This invention, however, provides a clock mechanism so associated with the standard clock on automobiles that it will cooperate therewith and will record the actual running time of the motor.

Embodiments of the invention are shown in the accompanying drawings, in which:—

Figure 1:
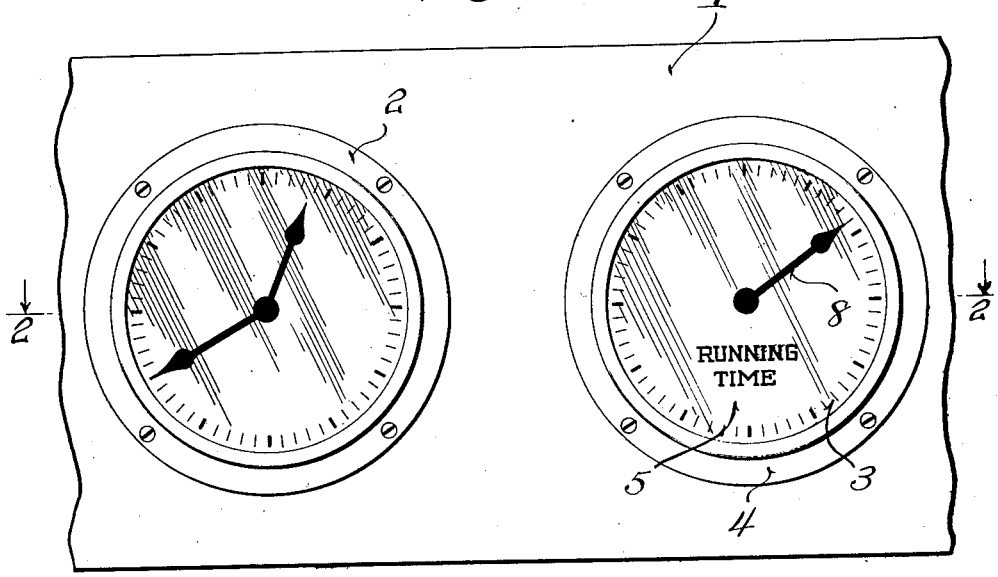
Figure 1 is a front view of a portion of the dash showing the ordinary clock and the recording dial in position.
Figure 2:
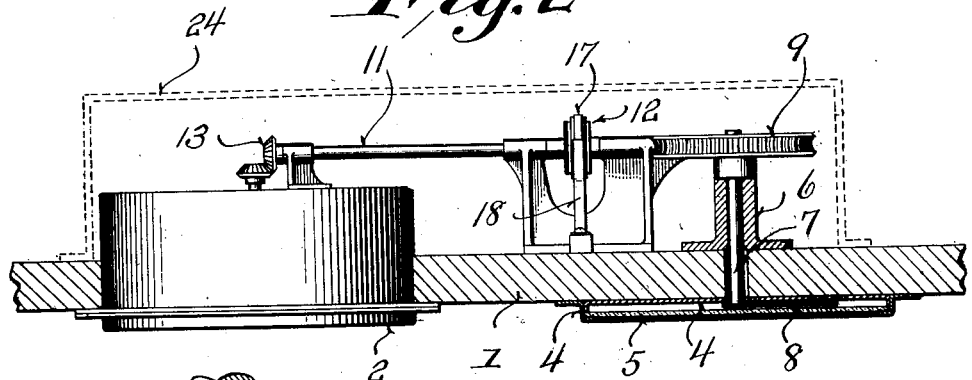
Figure 2 is a sectional view on the line 2—2 of Figure 1.

Referring to the drawings, it will be seen that the dash 1 is equipped with the usual clock 2 and is further equipped with an extra dial 3 housed within a suitable casing 4 provided with a transparent face 5, as most clearly shown in Figures 1 and 2.

The auxiliary device is provided with an elongated bearing 6 projecting rearwardly from the dash and carrying a rotary spindle 7 which latter is provided with a registering pointer or hand 8 on its forward end, such hand cooperating with the dial 3 to indicate the total running time of the engine.

Figure 3:
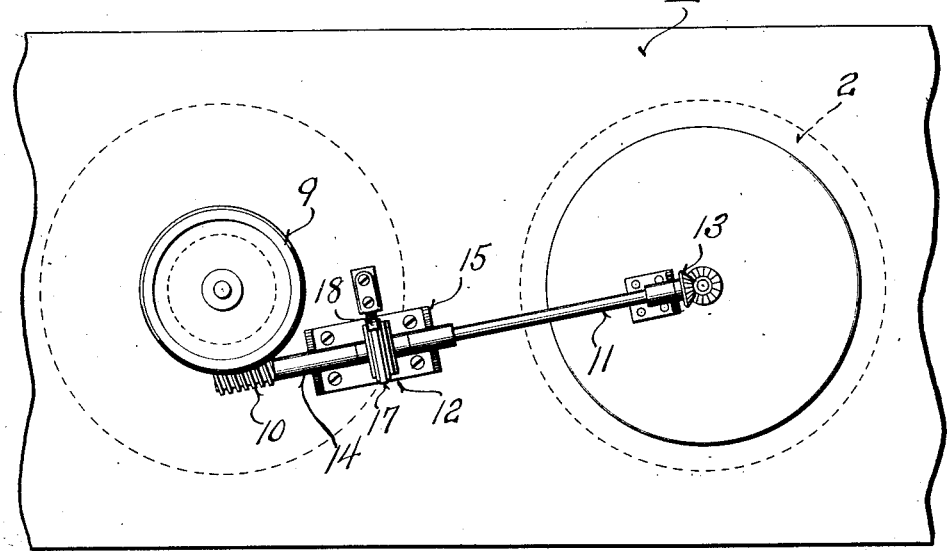
Figure 3 is a rear view of the structure shown in Figure 2.

The shaft 7 rigidly carries at its rear end a worm wheel 9 which, as may be seen from Figure 3, meshes with a worm 10. The worm 10 carried on a short stub shaft, which is adapted to be coupled with an aligning shaft 11 by means of an electromagnetic clutch indicated generally at 12. The shaft 11 is connected by beveled gears 13 with the shaft of the clock 2 or in fact with any suitable portion of the clock mechanism.

It is to be understood at this point that other mechanical connections between the registering hand 8 and the clock mechanism may be made if desired. However, it is intended that an electromagnetic clutch shall control the operative connection so that when the clutch is deenergized the driving connection is broken.

Figure 4:
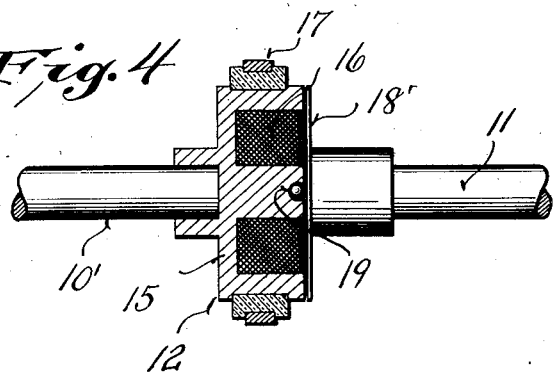
Figure 4 is an enlarged sectional detail illustrating the clutch construction.

Referring to Figure 4, it will be seen that the short shaft from the worm is indicated at 10' and from Figure 3 it will be seen that this shaft is carried within the elongated bearing 14 of the bracket 15 secured to the rear of the dash. The electromagnetic clutch may take any desired form. A very simple form is illustrated in Figure 4 in which it will be seen that the body portion 15 is provided with an annular channel which houses the winding 16. It is intended that one side of this winding be grounded to the body portion of the clutch and that the other side be connected to a slip ring 17 carried by the clutch and suitably insulated therefrom. This slip ring, as may be seen from Figures 2 and 3, is in electrical contact with a brush 18. The shaft 11 carries a flexible magnetic disk 18' which is drawn inwardly into contact with the body portion 15 of the clutch when the winding 16 is energized. A simple manner of holding the end of the shaft 11 away from the body portion 15 of the clutch is illustrated in Figure 4 from which it will be seen that a hardened steel ball 19 is socketed within the central portion of the body part of the clutch and bears against the end of the shaft 11 or against the hub of the flexible disk 18' if desired.

In a clutch of this type, a minute motion of the flexible disk is sufficient to cause operative coupling of the two shafts and, obviously, when the winding is deenergized, the disk immediately flies outwardly away from the clutch body.

Figure 5:
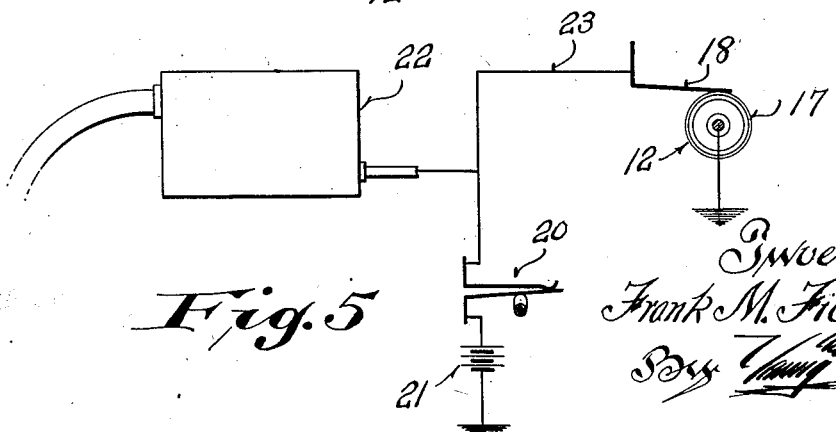
Figure 5 is a diagrammatic view of the wiring.

Referring to Figure 5, it will be seen that the ignition switch, indicated diagrammatically at 20, controls the connection of the battery 21 with the ignition apparatus 22 in the usual manner. An extra conductor 23 electrically connects the brush 18 with the switch 20 and thus permits current to pass to the electromagnetic clutch whenever the ignition switch is closed.

The operation of the apparatus is apparent from this description, it being noted that whenever the ignition switch is closed the registering mechanism is operatively coupled with the clock mechanism and registering takes place, and when the ignition is shut off the registering mechanism is disconnected from the clock. Thus, no additional thought is required on the part of the driver, it being merely necessary for him to operate the ignition switch in the usual manner.

It is, of course, obvious that the parts may be enclosed by a suitable housing, indicated in Figure 2, by the reference character 24, to prevent tampering therewith and, obviously, locks may be provided for preventing access to the dials of either the clock or the registering mechanism, although it has not been thought necessary to indicate conventional locks in the drawings.

Figure 6:
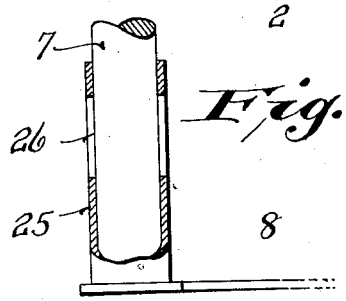
Figure 6 is a view of a modified detail of constructon.

It may be found desirable for certain types of the apparatus to provide frictional engagement between the hand 8 and the shaft 7 which is sufficiently positive to insure the rotation of the hand 8 yet permits resetting of the hand. This is easily accomplished by providing a sleeve 25, as shown in Figure 6, for the hand 8 which is slitted to provide yielding tongues 26. These tongues are pressed inwardly and bind frictionally against the shaft 7.

It will thus be seen that a very simple type of registering mechanism has been provided which is automatically connected with the clock whenever the motor is in operation, and which will accurately register the actual time of operation of the engine.

The device, namely, the clock and the registering dial and associated mechanism have been shown as distinct and separate entities in the drawings, for the sake of clearness, but is is apparent to anyone that the registering mechanism may be built bodily in the clock if desired.

Although the invention has been described in considerable detail, it is to be understood that the invention may be variously embodied and is, therefore, to be limited only as claimed.

I claim:

In an automobile, the combination of clock mechanism adapted for continuous operation and a registering device, both said clock mechanism and registering device being enclosed in a casing, a two-part shaft directly geared to said clock mechanism and to said registering device, a magnetic clutch for operatively coupling the two parts of said shaft, and a manually operable ignition switch for positively closing the electric circuit of said clutch when said ignition is turned on.

In testimony that I claim the foregoing I have hereunto set my hand at Davenport, in the county of Scott and State of Iowa.

FRANK M. FICHTEN.